US012111107B2

(12) United States Patent
Moore et al.

(10) Patent No.: US 12,111,107 B2
(45) Date of Patent: Oct. 8, 2024

(54) SAFETY LOCKING MECHANISM FOR A MULTI-PANE DOOR ASSEMBLY OF AN OVEN APPLIANCE

(71) Applicant: Haier US Appliance Solutions, Inc., Wilmington, DE (US)

(72) Inventors: Daniel Ian Moore, Louisville, KY (US); John Adam Yantis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 555 days.

(21) Appl. No.: 17/313,175

(22) Filed: May 6, 2021

(65) Prior Publication Data

US 2022/0357106 A1 Nov. 10, 2022

(51) Int. Cl.

*F27D 19/00* (2006.01)
*E05B 47/06* (2006.01)
*E05B 65/06* (2006.01)
*E05C 7/02* (2006.01)

(Continued)

(52) U.S. Cl.

CPC .......... *F27D 19/00* (2013.01); *E05B 47/0607* (2013.01); *E05B 65/06* (2013.01); *E05C 7/02* (2013.01); *F24C 15/023* (2013.01); *F24C 15/045* (2013.01); *E05B 47/0611* (2013.01); *E05B 47/0623* (2013.01); *E05Y 2900/308* (2013.01); *F27D 2019/0084* (2013.01)

(58) Field of Classification Search

CPC .. E05B 47/0607; E05B 65/06; E05B 47/0611; E05B 47/0623; E05C 7/02; E05Y 2900/308; F24C 15/023; F24C 15/045; F27D 19/00; F27D 2019/0084

USPC .......................................................... 126/197

See application file for complete search history.

(56) References Cited

U.S. PATENT DOCUMENTS 3,489,135 A 1/1970 Astrella
7,895,998 B2 3/2011 Lee (Continued)

FOREIGN PATENT DOCUMENTS

CA 2848900 A1 * 10/2015 .............. F24C 14/00
CN 201700302 U 1/2011

(Continued)

*Primary Examiner* — Steven B McAllister
*Assistant Examiner* — Benjamin W Johnson
(74) *Attorney, Agent, or Firm* — Dority & Manning, P.A.

(57) ABSTRACT

A multi-pane door assembly for an oven appliance includes a door having first and second door panes. The first door pane is secured to the second door pane at a hinge point and is rotatable with respect to the second door pane between open and closed positions. As such, the door panes define a space therebetween when the first door pane is in the closed position. The door assembly also includes an engagement device for securing the door panes together, a locking mechanism for locking the engagement device, and a controller communicatively coupled to the actuating device. The locking mechanism includes, at least, a locking member and an actuating device. Thus, the controller is configured to receive one or more safety conditions relating to the oven appliance and select whether to engage or disengage the actuating device based on whether the safety condition(s) correspond to the predetermined safety condition(s).

18 Claims, 11 Drawing Sheets

(51) Int. Cl.
*F24C 15/02* (2006.01)
*F24C 15/04* (2006.01)

(56) References Cited

U.S. PATENT DOCUMENTS

| | | | | |
|---|---|---|---|---|
| 8,689,781 | B1 * | 4/2014 | Chilton | F24C 15/022 126/192 |
| 9,138,056 | B2 | 9/2015 | Youngwoo | |
| 9,677,771 | B2 | 6/2017 | Armstrong | |
| 10,398,260 | B2 | 9/2019 | Park | |
| 10,502,433 | B2 | 12/2019 | Na | |
| 2014/0190083 | A1 * | 7/2014 | Lepie | E05B 43/00 49/280 |
| 2017/0108228 | A1 * | 4/2017 | Park | F24C 15/024 |
| 2017/0248321 | A1 | 8/2017 | Khan | |
| 2019/0063123 | A1 | 2/2019 | Ham | |

FOREIGN PATENT DOCUMENTS

| | | | |
|---|---|---|---|
| CN | 205514184 | U | 8/2016 |
| WO | WO2018224159 | A1 | 12/2018 |

* cited by examiner

SAFETY LOCKING MECHANISM FOR A MULTI-PANE DOOR ASSEMBLY OF AN OVEN APPLIANCE

FIELD OF THE INVENTION

The present subject matter relates generally to oven appliances, and more particularly to multi-pane door assemblies for oven appliances.

BACKGROUND OF THE INVENTION

Oven appliances generally include a cabinet with a cooking chamber positioned therein. The cooking chamber is configured for receipt of food articles for cooking. The oven appliance also includes one or more heating elements for generating heat energy for cooking. The heating element can be, e.g., an electric resistance element or a gas burner. Certain oven appliances also include features for forcing movement of heated air within the cooking chamber. Oven appliances also generally include one or more doors that provide selective access to the cooking chamber.

Conventional doors often include glass panels or panes which allow a user to observe the cooking chamber therethrough during a cooking operation. The double pane configuration provides an insulating feature to retain heat within the cooking chamber during the cooking operation. In some instances, such double pane doors may include vent holes, assembly holes, and/or other apertures to allow airflow and/or to create thermal barriers between the cooking chamber and external surfaces of the oven appliance. Unfortunately, such holes/apertures are also paths through which grease or foreign substances may enter the space between the multiple panes. Additionally, cooking certain foods in the cooking chamber can generate large amounts of steam and grease, which can also enter the door openings. In addition, when a user is placing food into or removing food from the cooking chamber, spills may occur on the glass panes. Additionally, spills that occur while cooking on the cooktop may roll down the front of the range and onto the door. Therefore, the inner and outer surfaces of the glass panes may become dirty or otherwise obstructed, reducing the visibility of the cooking chamber for the user.

In addition, certain double pane doors may be equipped with additional electronic, control, optical, and/or other operational equipment in the space between the panes, which may require access and/or maintenance from time to time. As such, it is beneficial for a user to be able to access the space between the multiple panes.

For many oven doors, the space between the multiple panes of the oven door is not consumer accessible, and multiple fasteners need to be removed to service the parts located within the door. For example, for many conventional double-pane oven doors, a user is typically required to fully disassemble the door (e.g., remove the door from the oven appliance and manually separate the panes from each other) in order to access the space between the panes that require cleaning and/or maintenance. However, such disassembly is complex and may cause damage to the door. In addition, the separate glass panes are cumbersome, thereby potentially leading to breakage of the panes and/or injury to the user.

Accordingly, it is desirable for a user to be able to have easier access to the space between the panes of the oven door for easy cleaning and/or part maintenance. However, this can be a dangerous situation as the inside surfaces of the door can be too hot to touch. Additionally, if the door is allowed to split apart, while it is at an angle, the primary door spring could suddenly snap the door shut, causing damage or harm to the user.

Thus, the present disclosure is directed to a safety locking mechanism for preventing access to the inside of a multi-pane door if the inner surfaces are above a certain temperature as well as when the oven door is open (i.e., at an angle) so as to address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a multi-pane door assembly for an oven appliance. The multi-pane door assembly includes a door having a first door pane and a second door pane. The first door pane is secured to the second door pane at a hinge point such that the first door pane is rotatable with respect to the second door pane between an open position and a closed position. The first and second door panes define a space therebetween when the first door pane is in the closed position. The multi-pane door assembly also includes an engagement device for securing the first and second door panes together and a locking mechanism for locking the engagement device so as to lock the first door pane with respect to the second door pane in the closed position. The locking mechanism includes, at least, a locking member and an actuating device. The multi-pane door assembly further includes a controller communicatively coupled to the actuating device to control movement of the actuating device. The controller includes at least one processor configured to perform a plurality of operations. The plurality of operations include, for example, receiving one or more safety conditions relating to the oven appliance and selecting whether to engage or disengage the actuating device based on whether the one or more safety conditions correspond to the one or more predetermined safety conditions.

In another aspect, the present disclosure is directed to a method of operating a multi-pane door assembly of an oven appliance. The multi-pane door assembly includes a door having a first door pane and a second door pane. The first door pane is secured to the second door pane at a hinge point such that the first door pane is rotatable with respect to the second door pane between an open position and a closed position. The method includes maintaining the first and second door panes together in the closed position via an engagement device. The method also includes locking the first door pane with respect to the second door pane in the closed position via a locking mechanism that engages the engagement device, the locking mechanism having, at least, a locking member and an actuating device. Further, the method includes receiving, via a controller, one or more safety conditions relating to the oven appliance. Moreover, the method includes determining, via the controller, whether the one or more safety conditions correspond to one or more predetermined safety conditions. Thus, the method includes selecting, via the controller, whether to engage or disengage the actuating device of the locking mechanism based on whether the one or more safety conditions correspond to the one or more predetermined safety conditions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
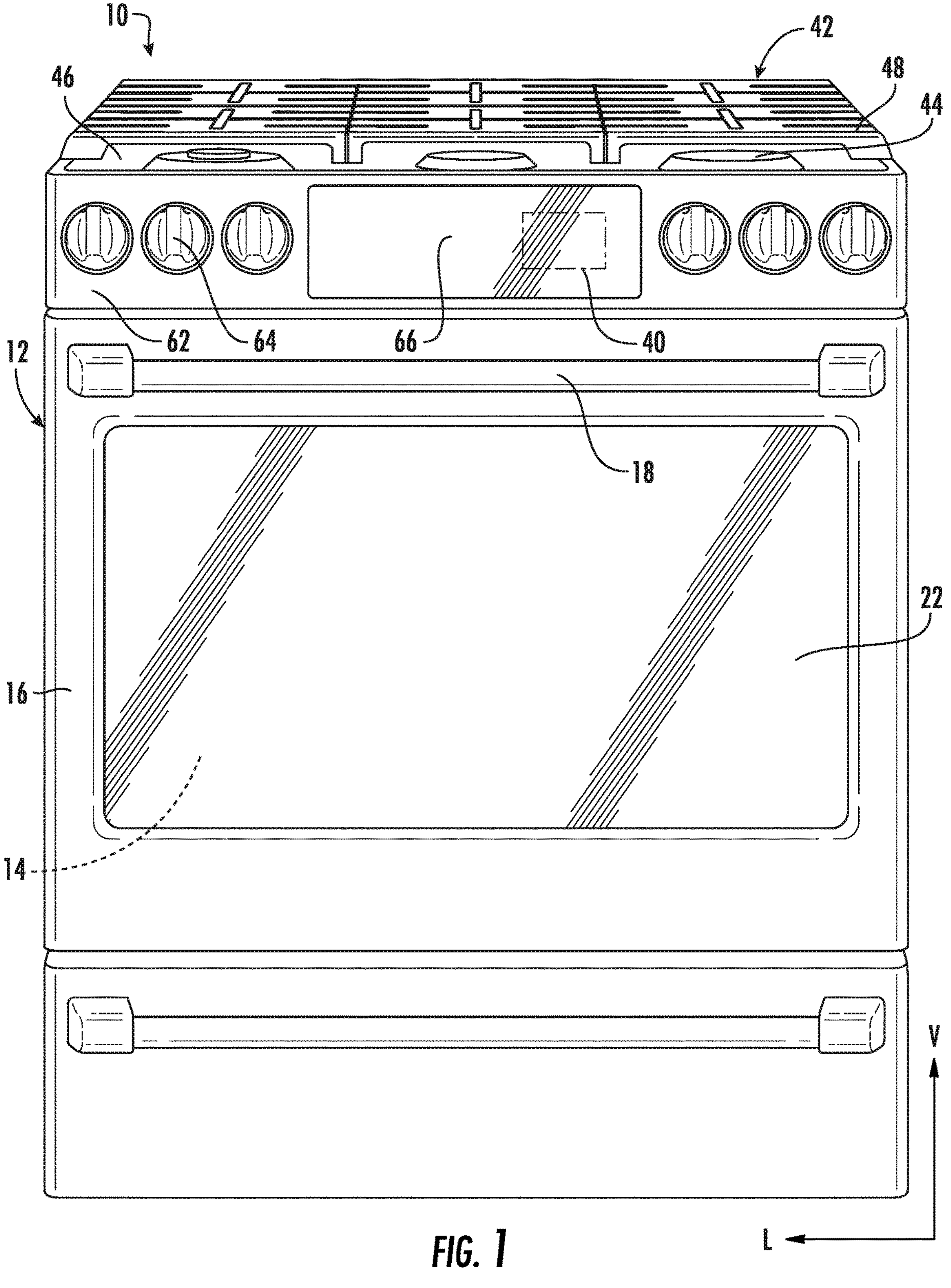
FIG. 1 provides a front view of an oven appliance having a door assembly in a closed position according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Referring now to the figures, FIG. 1 illustrates a perspective view of a cooking appliance, such as an oven appliance 10, according to exemplary embodiments of the present disclosure. Generally, the oven appliance 10 defines a vertical direction V, a lateral direction L, and a transverse direction T. The vertical direction V, lateral direction L, and transverse direction T are mutually perpendicular and form an orthogonal direction system. As will be understood, the oven appliance 10 is provided by way of example only, and the present subject matter may be used in any suitable appliance. Thus, the present disclosure may be used with other oven, range, or oven appliance configurations (e.g., configurations that define multiple interior cavities for the receipt of food, include no interior cavities, or are otherwise different than the configuration shown in FIG. 1), as well as other suitable appliances, as would be understood in light of the present disclosure.

The oven appliance 10 includes an insulated cabinet 12 with an interior cooking chamber 14 defined by an interior surface of cabinet 12. The cooking chamber 14 is configured for the receipt of one or more food items to be cooked. The oven appliance 10 includes a door 16 rotatably mounted to cabinet 12 (e.g., with a hinge—not shown). A handle 18 may be mounted to door 16 and may assist a user with opening and closing door 16 in order to access an opening to cooking chamber 14. For example, a user can pull on the handle 18 to open or close door 16 and access cooking chamber 14 through the opening. As would be understood, one or more internal heating elements (e.g., baking or broiling heating elements) may be provided within cooking chamber 14 to cook or otherwise heat items therein.

Further, the oven appliance 10 can include a seal (not shown) between the door 16 and the cabinet 12 that assist with maintaining heat and cooking fumes within cooking chamber 14 when the door 16 is in a closed position, as shown in FIG. 1. One or more parallel glass panes 22 provide for viewing the contents of cooking chamber 14 when door 16 is closed and assist with insulating cooking chamber 14. Optionally, a baking rack (not pictured) is positioned in cooking chamber 14 for the receipt of food items or utensils containing food items.

Moreover, the oven appliance 10 may include a cooktop surface 42 having one or more heating elements 44 for use in heating or cooking operations. In exemplary embodiments, the cooktop surface 42 is comprised of a metal (e.g., steel) panel 46 on which one or more grates 48, described in further detail below, may be supported. In other embodiments, however, the cooktop surface 42 may be constructed of another suitable material, such as a ceramic glass or another suitable non-metallic material. In alternative embodiments, the oven appliance 10 may be a wall oven without the cooktop surface 42.

Further, the heating elements 44 may be various sizes, as shown in FIG. 1, and may employ any suitable method for heating or cooking an object, such as a cooking utensil (not shown), and its contents. In one embodiment, for example, the heating element(s) 44 may use a heat transfer method, such as electric coils or gas burners, to heat the cooking utensil. In another embodiment, however, the heating element(s) 44 uses an induction heating method to heat the cooking utensil directly. In turn, heating element may include a burner element, electric heat element, induction element, or another suitable heating element.

Some embodiments of the oven appliance 10 may further include a controller 40 (e.g., configured to control one or more operations of oven appliance 10 and/or the multi-pane door assembly 100 described herein). For example, the controller 40 may control at least one operation of the oven appliance 10 that includes an internal heating element or cooktop heating element 44 and/or the door 16. As such, the controller 40 may be in communication (e.g., via a suitable wired or wireless connection) with the multi-pane door assembly 100 and/or one or more of heating element(s) 44, as well as any other suitable components of the oven appliance 10, as discussed herein. In general, the controller 40 may be operable to configure the oven appliance 10 (and various components thereof) for cooking. Such configuration may be based, for instance, on a plurality of cooking factors of a selected operating cycle or mode.

By way of example, the controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

In an embodiment, the controller 40 may be positioned in a variety of locations throughout the oven appliance 10. As illustrated, the controller 40 may be located within a user interface 62 of the oven appliance 10. In some such embodiments, input/output ("I/O") signals may be routed between the controller 40 and various operational components of the oven appliance 10, such as the door 16, the heating element(s) 44, control knobs 64, display component 66, sensors, alarms, or other components as may be provided. For instance, signals may be directed along one or more wiring harnesses that may be routed through cabinet 12. In some embodiments, the controller 40 is in communication with the user interface assembly 62 and the control knobs 64 through which a user may select various operational features and modes and monitor progress of the oven appliance 10. In one embodiment, the user interface 62 may represent a general purpose I/O ("GPIO") device or functional block. In another embodiment, the user interface 62 may include input components, such as one or more of a variety of electrical, mechanical, or electro-mechanical input devices including rotary dials, push buttons, and touch pads. Further, the user interface 62 may include a display component 66, such as a digital or analog display configured to provide operational feedback to a user.

Figure 2:
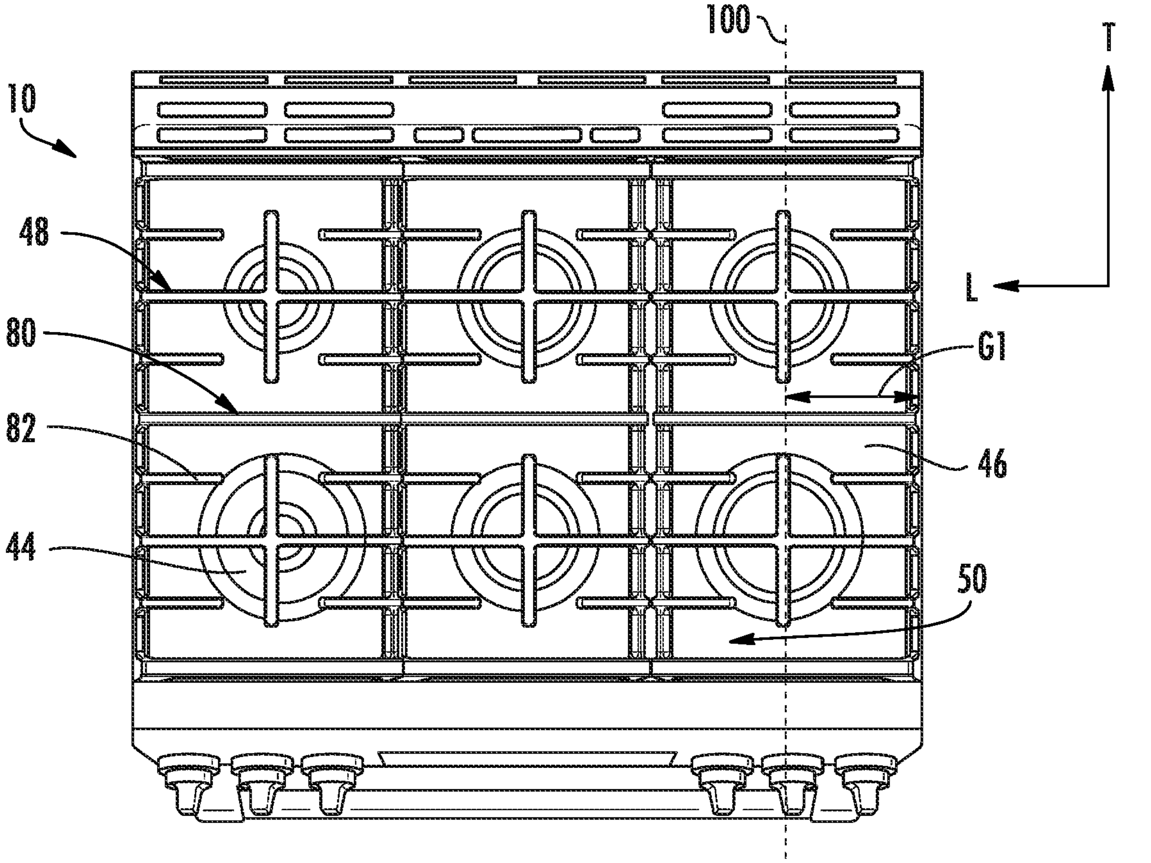
FIG. 2 provides a top view of the exemplary oven appliance of FIG. 1.

Referring now to FIG. 2, a top view of the oven appliance 10 of FIG. 1 is illustrated. As described above, the cooktop surface 42 may include a plurality of heating elements 44 and a panel 46. The panel 46 may be concave (e.g., downward along the vertical direction V) to form a depression or cavity 50 therein. Thus, the heating element(s) 44 may be provided within the cavity 50, and cooking grates 48 may be positioned over top of the heating element(s) 44 (e.g., along the vertical direction V). In this example, the cooktop surface 42 includes six heating elements 44. It should be noted that the disclosure is not limited to this, and the cooktop surface 42 may include fewer or more heating elements 44 as specific applications dictate. In some embodiments, one or more heating elements 44 may be located proximate an edge of panel 46, as will be described in more detail below.

In addition, as shown, the cooktop surface 42 may include one or more cooking grates 48 provided over the heating elements 44. As shown in FIG. 2, for example, the cooktop surface 42 may include three cooking grates 48. It should be noted that the disclosure is not limited to this, and the cooktop surface 42 may include fewer or more cooking grates 48 as specific applications dictate. Each cooking grate 48 may extend from a rear of panel 46 to a front of the panel 46 along the transverse direction. Additionally, or alternatively, the cooking grates 48 may be positioned adjacent to each other along the lateral direction L.

Figure 3:
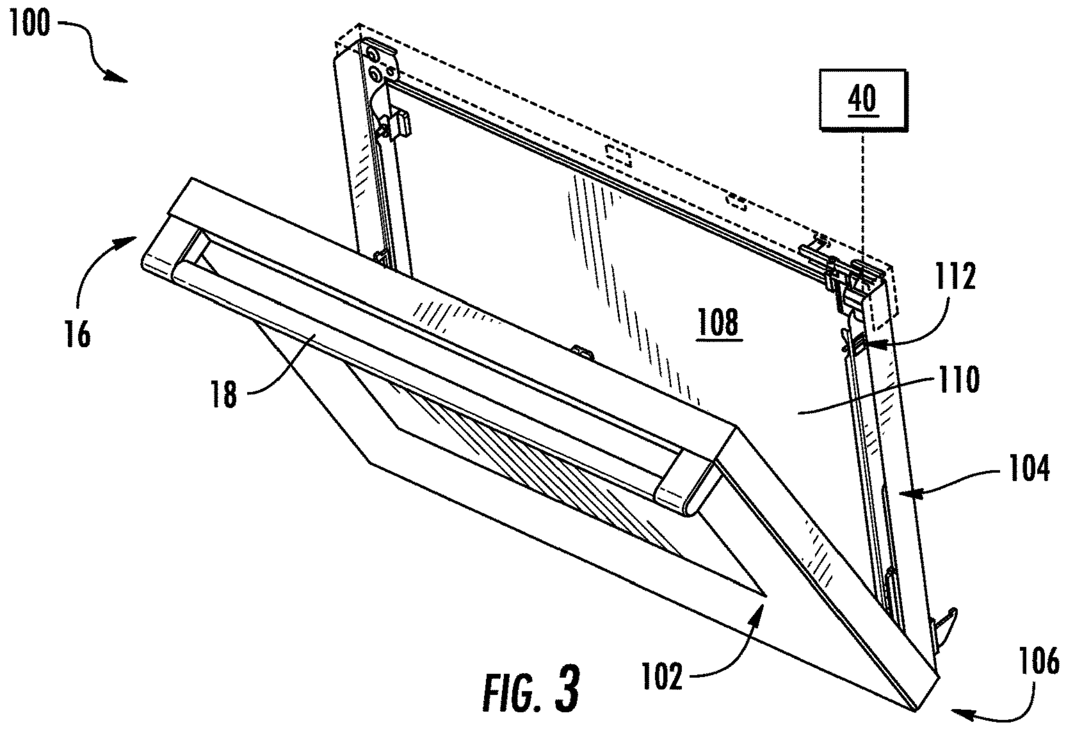
FIG. 3 provides a perspective view of a multi-pane door assembly of an oven appliance in an open position according to exemplary embodiments of the present disclosure.
Figure 4:
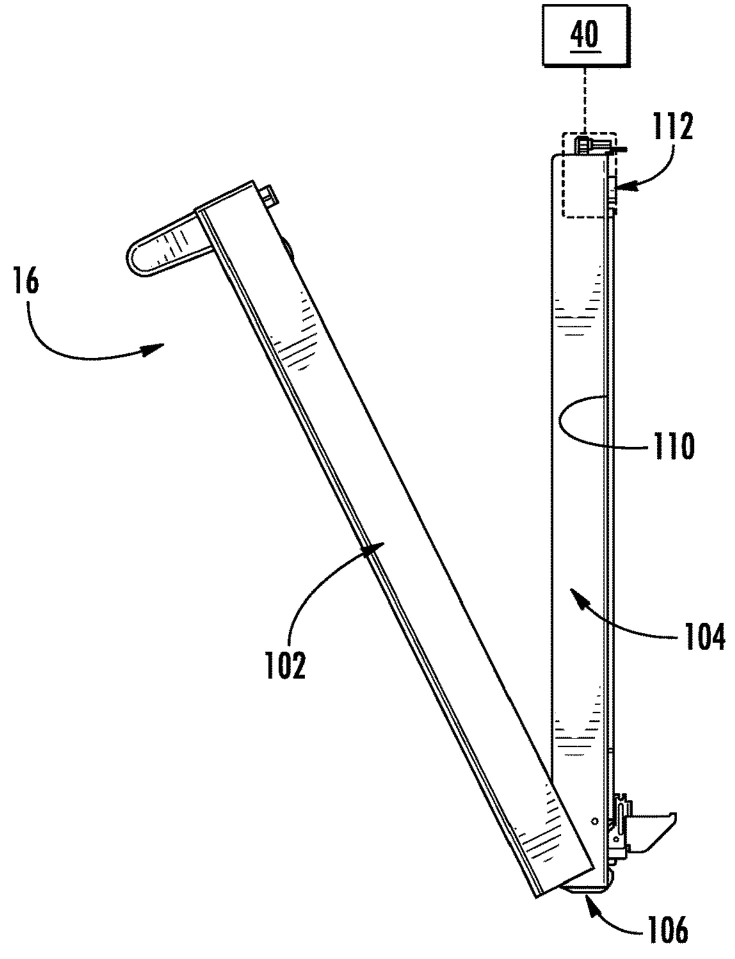
FIG. 4 provides a side view of a multi-pane door assembly of an oven appliance in an open position according to exemplary embodiments of the present disclosure.
Figure 5:
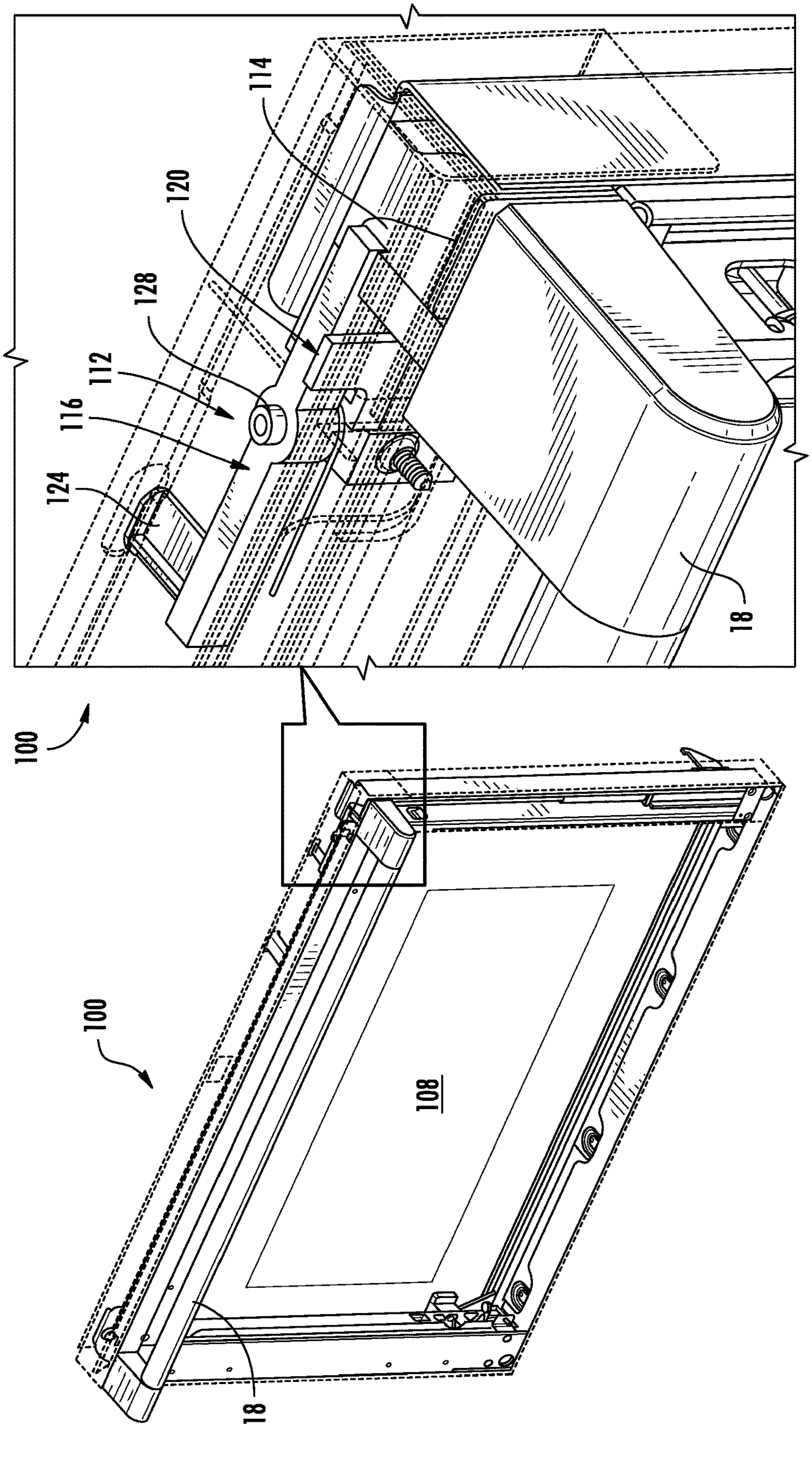
FIG. 5 provides a perspective view of a multi-pane door assembly of an oven appliance in a closed position according to exemplary embodiments of the present disclosure, particularly illustrating a locking mechanism of the multi-pane door assembly.

Referring now to FIGS. 3-5, various views of a multi-pane door assembly 100 of an oven appliance, such as the door 16 of the oven appliance 10, in an open position (FIGS. 3 and 4) and a closed position (FIG. 5) according to exemplary embodiments of the present disclosure are illustrated, respectively. More specifically, as shown, the multi-pane door assembly 100 includes the door 16, which has a first door pane 102 and a second door pane 104. Further, as shown, the first door pane 102 is secured to the second door pane 104 at a hinge point 106 such that the first door pane 102 is rotatable with respect to the second door pane 104 between an open position (FIGS. 3 and 4) and a closed position (FIGS. 1 and 2). Further, in such embodiments, the first and second door panes 102, 104 define a space 108 (FIG. 3) or volume therebetween when the first door pane 102 is in the closed position. Moreover, as shown in FIG. 5, the multi-pane door assembly 100 also includes an engagement device 114 for removably securing the first and second door panes 102, 104 together. For example, as shown, the engagement device 114 may be a latch or a catch. It should be further understood that the engagement device 114 may be any suitable type of mechanical fastener that joins two (or more) objects or surfaces while allowing for their regular separation.

In addition, as shown, the first door pane 102 can be locked to the second door pane 104 via a locking mechanism 112 that is controlled via the controller 40. For example, in certain embodiments, the locking mechanism 112 is configured to lock the engagement device 114. Thus, in such embodiments, in a locked position, the first door pane 102 is prevented from being separated from the second door pane 104. Whereas, in an unlocked position, the first door pane 102 can be separated from the second door pane 104 to expose the space 108, i.e., as shown in FIGS. 3 and 4.

However, as mentioned, accessing the space 108 between the first and second door panes 102, 104 can be a dangerous situation as the inside surfaces 110 can be too hot to touch. Additionally, if the door 16 is allowed to split apart, while it is at an angle (as shown in FIGS. 3 and 4), the first door pane 102 can suddenly snap the door 16 shut, causing damage or harm to the user. Accordingly, the locking mechanism 112 of the present disclosure restricts opening of the first door pane 102 with respect to the second door pane 104 only upon satisfaction of certain safety conditions to allow a user to safely access to the space 108 between the first and second door panes 102, 104, e.g., for easy cleaning and/or part maintenance.

Figure 8:
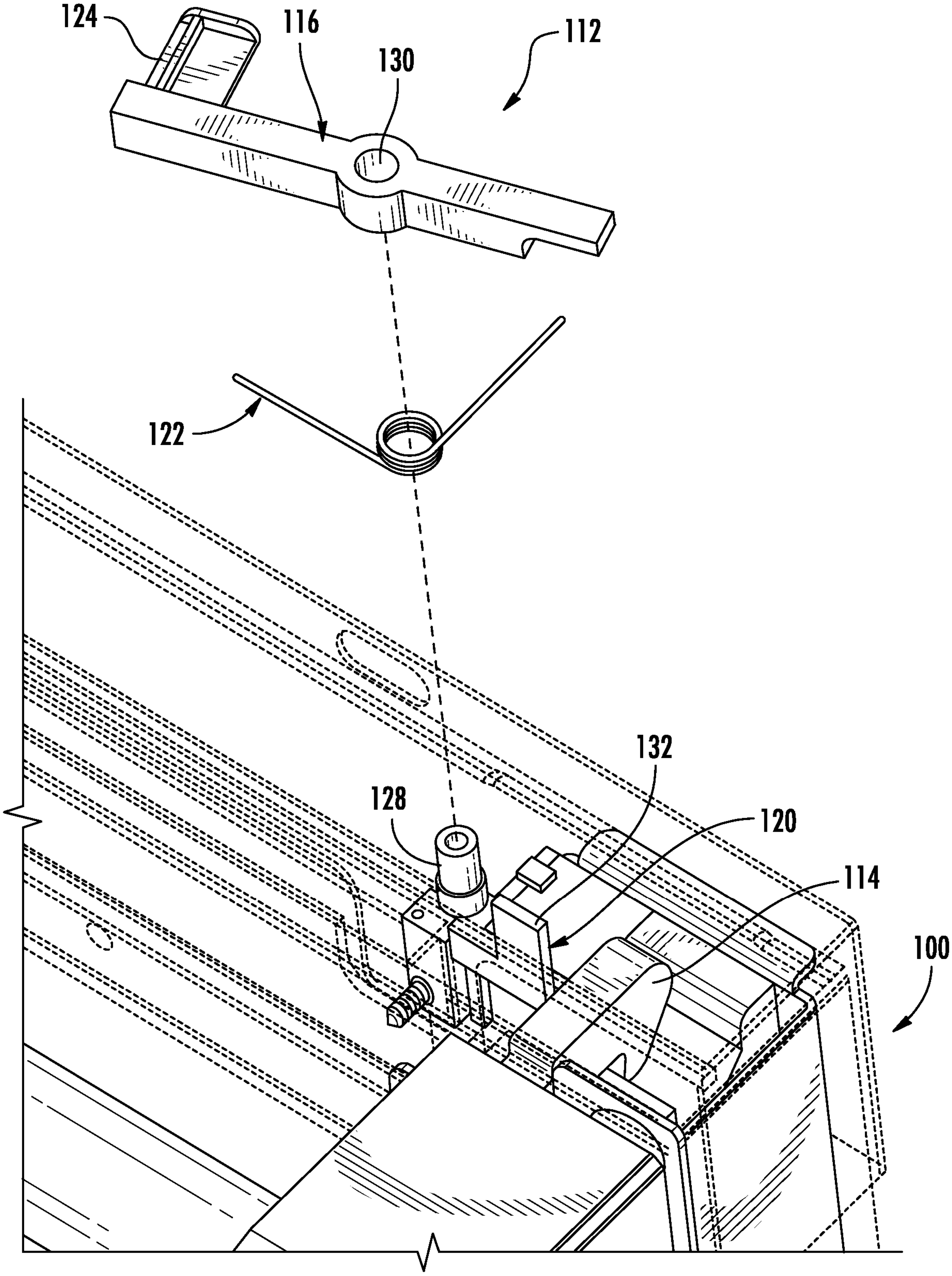
FIG. 8 provides an exploded, perspective view of a locking mechanism of the multi-pane door assembly according to exemplary embodiments of the present disclosure.
Figure 9:
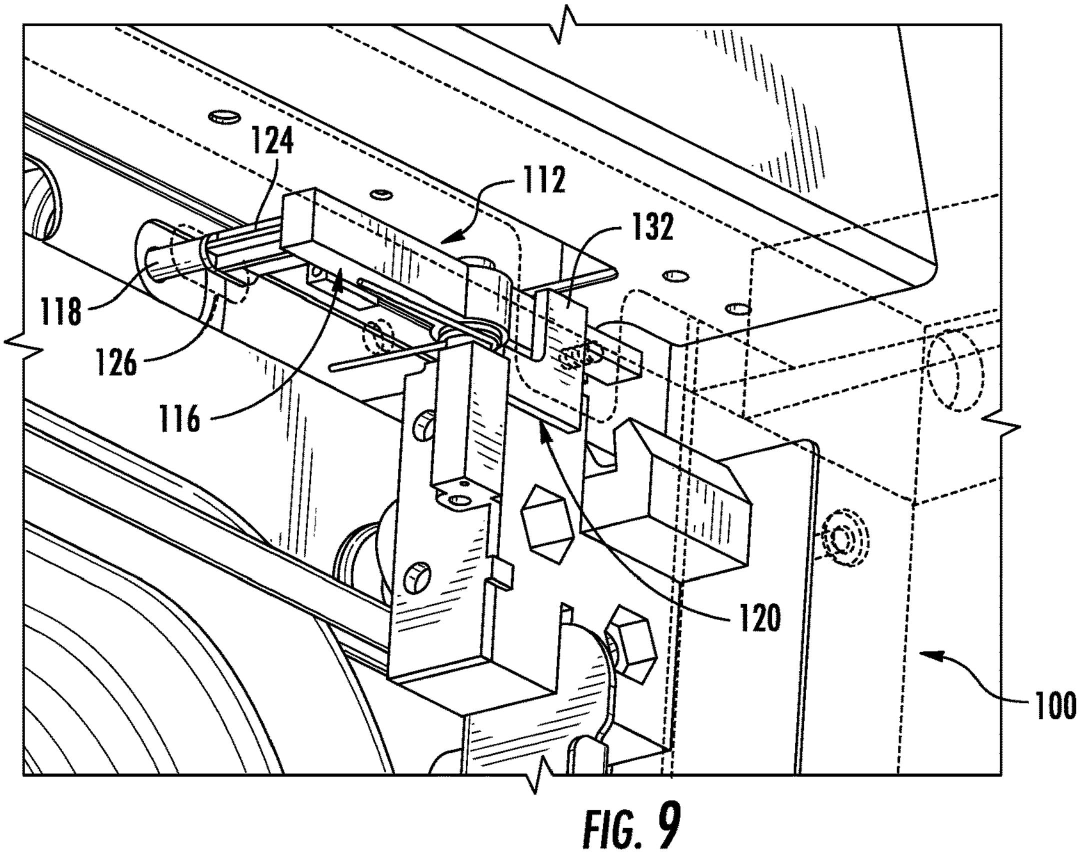
FIG. 9 provides another detailed, perspective view of a locking mechanism of the multi-pane door assembly according to exemplary embodiments of the present disclosure, particularly illustrating the locking mechanism in a locked position.
Figure 10:
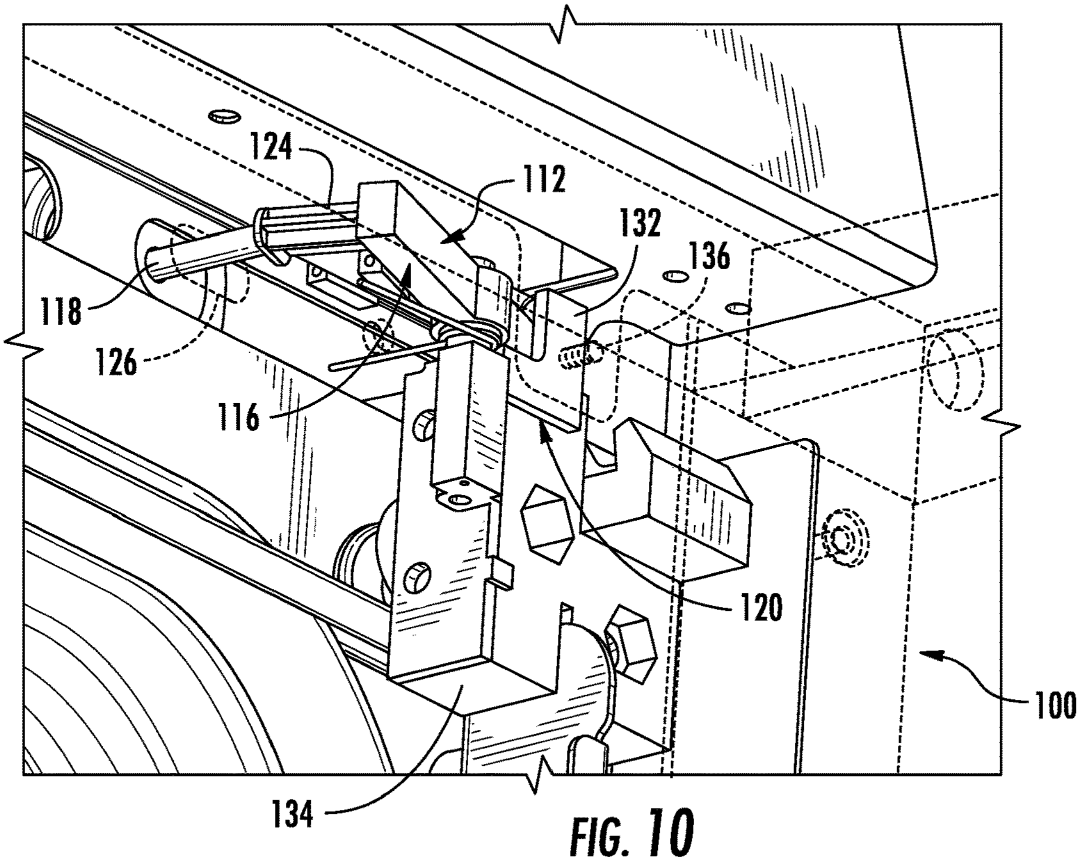
FIG. 10 provides another detailed, perspective view of a locking mechanism of the multi-pane door assembly according to exemplary embodiments of the present disclosure, particularly illustrating the locking mechanism in a unlocked position.

Referring now to FIGS. 5-10, various views of embodiments of the locking mechanism 112 are illustrated according to the present disclosure. More specifically, as shown, the locking mechanism 112 includes, at least, a locking member 116 and an actuating device 118 (FIGS. 9 and 10). Moreover, as shown, the locking mechanism 112 further includes a base member 120 (FIGS. 5-10) and a spring member 122 (FIG. 8) arranged between the locking member 116 and the base member 120. In such embodiments, as shown in FIGS. 9 and 10, the base member 122 may be mounted to an internal structure 134 of the door 16, e.g., via one or more fasteners 136. Thus, as shown, the locking member 116 may be rotatably coupled to the base member 120, which can remain fixed.

For example, in particular embodiments, as shown in FIGS. 5-8, the base member 120 may include a pivot arm 128. In such embodiments, as shown, the locking member 116 may include a corresponding through hole 130 (FIG. 8) that receives the pivot arm 128 to allow for rotation of the locking member 116 with respect to the base member 120. Moreover, in specific embodiments, as shown in FIGS. 5-10, the base member 120 may also include a stop feature 132, such as a wall, for limiting rotation of the locking member 116 with respect to the base member 120.

Figure 6:
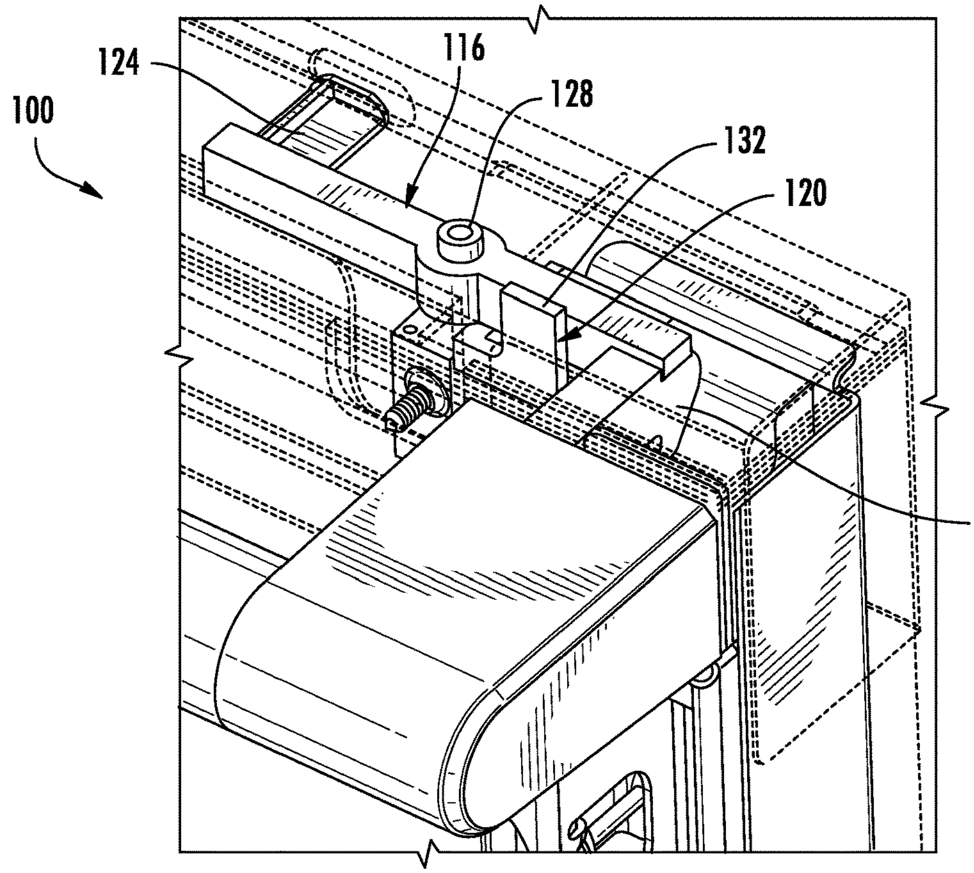
FIG. 6 provides a detailed, perspective view of a locking mechanism of the multi-pane door assembly according to exemplary embodiments of the present disclosure, particularly illustrating the locking mechanism in a locked position.
Figure 7:
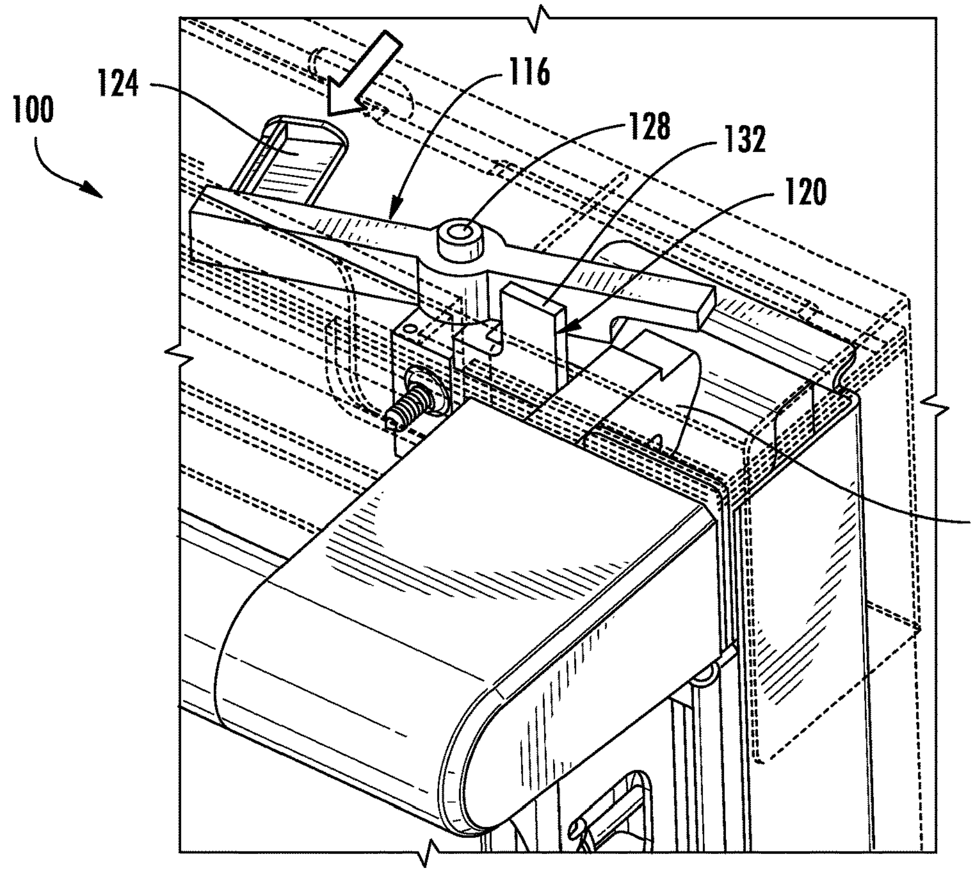
FIG. 7 provides a detailed, perspective view of a locking mechanism of the multi-pane door assembly according to exemplary embodiments of the present disclosure, particularly illustrating the locking mechanism in a unlocked position.

Furthermore, the spring member 122 of the locking mechanism 112 is configured to bias the locking member 116 in the closed position (FIGS. 6 and 9). In particular embodiments, as shown in FIG. 8, the spring member 122 may be a torsion spring. It should be understood that any other suitable spring may also be within the spirit and scope of the invention.

Figure 11:
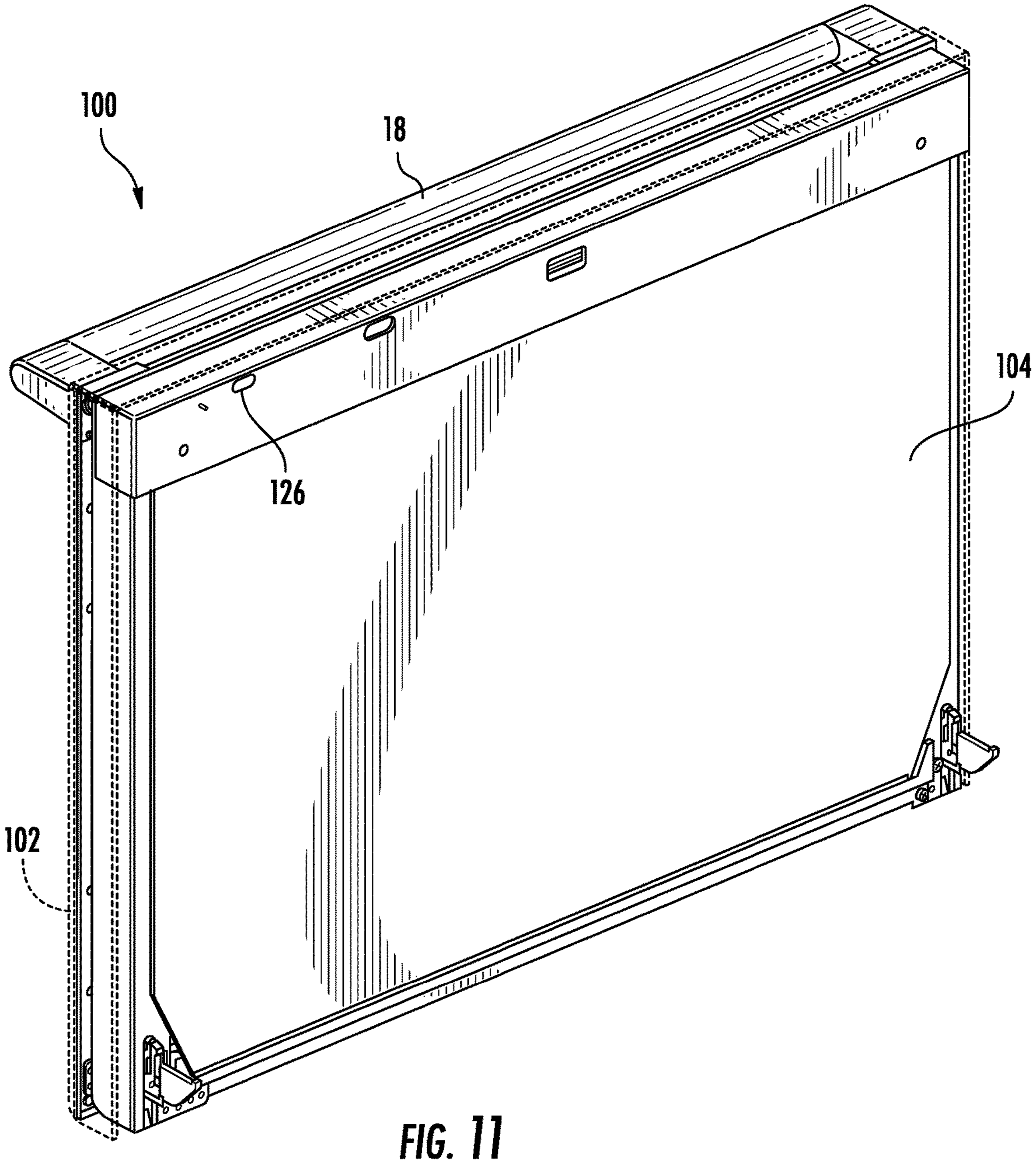
FIG. 11 provides a perspective, rear view of a multi-pane door assembly of an oven appliance according to exemplary embodiments of the present disclosure.

In addition, in certain embodiments, as shown in FIGS. 5-10, the locking member 116, the spring member 122, the base member 120, and the engagement device 114 may be arranged within the space 108 between the first and second door panes 102, 104. Moreover, as shown in FIGS. 9 and 10, the actuating device 118 may be arranged within the cabinet 12 of the oven appliance 10. More specifically, as shown in FIGS. 5-10, the locking member 116 may further include a protrusion member 124, e.g., that aligns with an opening 126 in the second door pane 104 (e.g., as shown in FIG. 11). In such embodiments, as shown in FIGS. 9 and 10, the actuating device 118 is configured to engage the locking member 116 through the opening 126 in the second door pane 104. Thus, in several embodiments, as shown in FIGS. 9 and 10, upon engagement of the locking member 116 by the actuating device 118, biasing of the spring member 122 can be overcome by the actuating device 118 to push the locking member 116 so as to release the engagement device 114.

Figure 12:
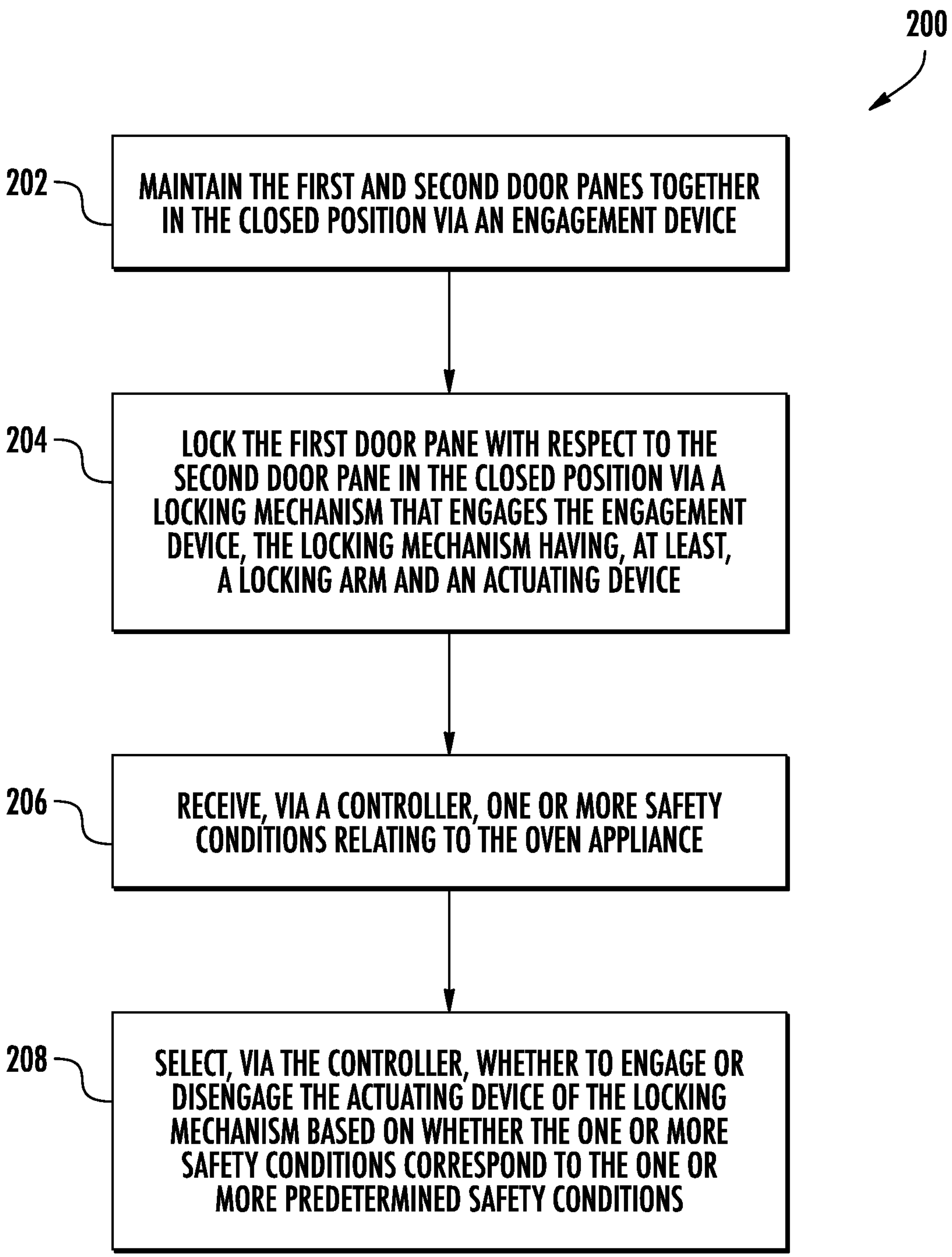
FIG. 12 provides a flow chart of a method of operating a multi-pane door assembly of an oven appliance according to exemplary embodiments of the present disclosure.

In additional embodiments, as mentioned, the controller 40 described herein may be communicatively coupled to the multi-pane door assembly 100, and more particularly to the actuating device 118 to control movement thereof. Thus, referring now to FIG. 12, a flow chart of one embodiment of a method 200 for operating the multi-pane door assembly 100, such as via the controller 40, is illustrated. In general, the method 200 will be described herein with reference to the multi-pane door assembly 100 of the oven appliance 10 illustrated in FIGS. 1-11. However, it should be appreciated that the disclosed method 200 may be implemented with multi-pane door assemblies and/or oven appliances having any other suitable configurations. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes maintaining the first and second door panes 102, 104 together in the closed position via the engagement device 114. For example, in an embodiment, the method 200 may include biasing the locking member 116 in the closed position via the spring member 122.

As shown at (204), the method 200 includes locking the first door pane 102 with respect to the second door pane 104 in the closed position via the locking mechanism 112 that engages the engagement device 114. For example, FIGS. 5 and 9 each illustrate the locking mechanism 112 in the locked position, which in turn locks the first door pane 102 with respect to the second door pane 104 in the closed position.

Referring back to FIG. 12, as shown at (206), the method 200 includes receiving, via the controller 40, one or more safety conditions relating to the oven appliance 10. For example, in an embodiment, the safety condition(s) may include a temperature condition of the oven appliance 10 and/or a position condition of the multi-pane door assembly 100. In such embodiments, the temperature condition may include, for example, a temperature measurement of the oven appliance 10 and/or a heating cycle status. More particularly, the heating cycle status may be activated or deactivated. Furthermore, in an embodiment, the position condition may be an open position or a closed position of the door 16.

Thus, as shown at (208), the method 200 includes selecting, via the controller 40, whether to engage or disengage the actuating device 118 of the locking mechanism 112 based on whether the safety condition(s) correspond to one or more predetermined safety conditions. For example, in an embodiment, selecting whether to engage or disengage the actuating device 118 based on whether the safety condition(s) correspond to the predetermined safety condition(s) may include selecting to engage the actuating device 118 only upon satisfaction of the safety condition(s) corresponding to the predetermined safety condition(s). Thus, in such embodiments, engaging the actuating device 118 is configured to move the locking member 116 so as to release the engagement device 114 to allow opening of the first door pane 102 with respect to the second door pane 104. More specifically, in an embodiment, if the safety conditions are satisfied, upon engagement of the locking member 116 by the actuating device 118, the biasing of the spring member 122 against the locking member 116 is overcome by the actuating device 118.

In addition, selecting whether to engage or disengage the actuating device 118 based on whether the safety condition(s) correspond to the predetermined safety condition(s) may include selecting to disengage the actuating device 118 from the locking member 116 when the safety condition(s) do not correspond to the predetermined safety condition(s). Therefore, in such embodiments, disengaging the actuating device 118 is configured to prevent movement of the locking member 116, thereby preventing release of the engagement device 114, which also prevents opening of the first door pane 102 with respect to the second door pane 104.

Accordingly, in an embodiment, the method 200 may include also determining whether the temperature condition and/or the position condition correspond to a predetermined temperature condition and a predetermined position condition, respectively. In such embodiments, the predetermined temperature condition may be that the heating cycle is deactivated and/or the temperature measurement is below a predetermined temperature threshold. Thus, such conditions indicate that the oven appliance 10 is cool and therefore safe for a user to touch. Moreover, in an embodiment, the predetermined position condition may be that the door 16 is in the closed position (i.e., and therefore will not slam shut if the first and second door panes 102, 104 are separated).

In another embodiment, the method 200 may further include aligning the protrusion member 124 of the locking member 116 with the opening 126 in the second door pane 104 and engaging the locking member 116 through the opening 126 in the second door pane 104 via the actuating device 118 only upon satisfaction of the safety condition(s) corresponding to the predetermined safety condition(s).

In further embodiments, the method 200 may also include receiving, via the controller 40, an indication of the oven appliance 10 being powered on and requiring the oven appliance 10 to be powered on before allowing opening of the first door pane 102 with respect to the second door pane 104 of the multi-pane door assembly 100.

Figure 13:
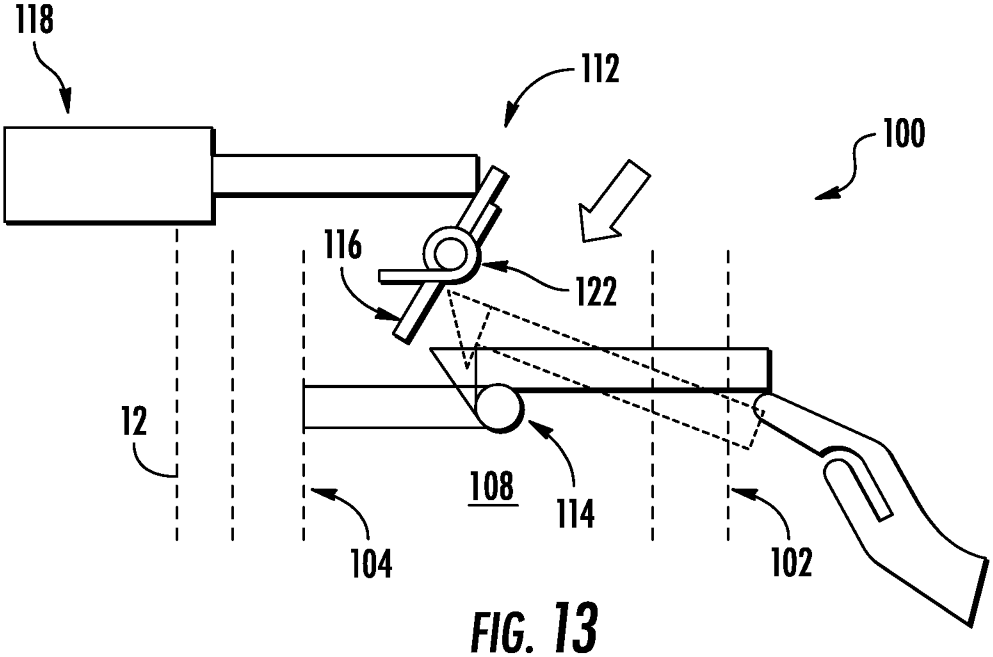
FIG. 13 provides a simplified, schematic diagram of operating a locking mechanism according to exemplary embodiments of the present disclosure, particularly illustrating the locking mechanism being unlocked in response to various safety conditions being satisfied.
Figure 14:
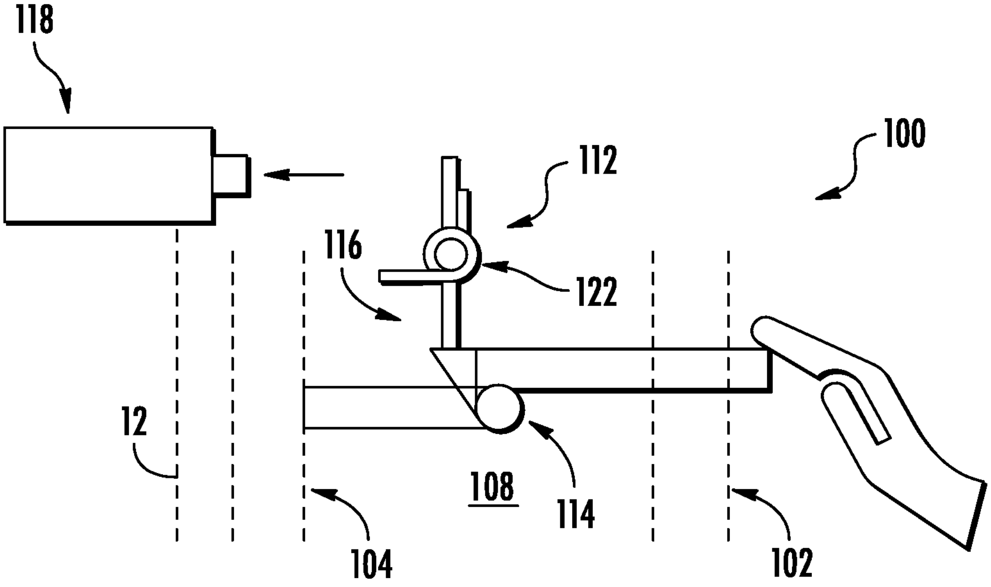
FIG. 14 provides a simplified, schematic diagram of operating a locking mechanism according to exemplary embodiments of the present disclosure, particularly illustrating the locking mechanism remaining locked in response to the oven appliance being too hot.

Referring now to FIGS. 13-16, various simplified, schematic diagrams are provided to further illustrate operating of the locking mechanism 112 described herein. As shown in FIG. 13, upon receipt by the controller 40 that the oven appliance 10 is cool and/or off, the controller 40 can send a signal to the actuating device 118 to engage the locking member 116, which allows a user to separate the first door pane 102 from the second door pane 104 (i.e., by releasing the engagement device 114). Alternatively, as shown in FIG. 14, upon receipt by the controller 40 that the oven appliance 10 is hot and/or a heating cycle is activated, the controller 40 can send a signal to the actuating device 118 to refrain from engaging the locking member 116, which prevents a user from separating the first door pane 102 from the second door pane 104.

Figure 15:
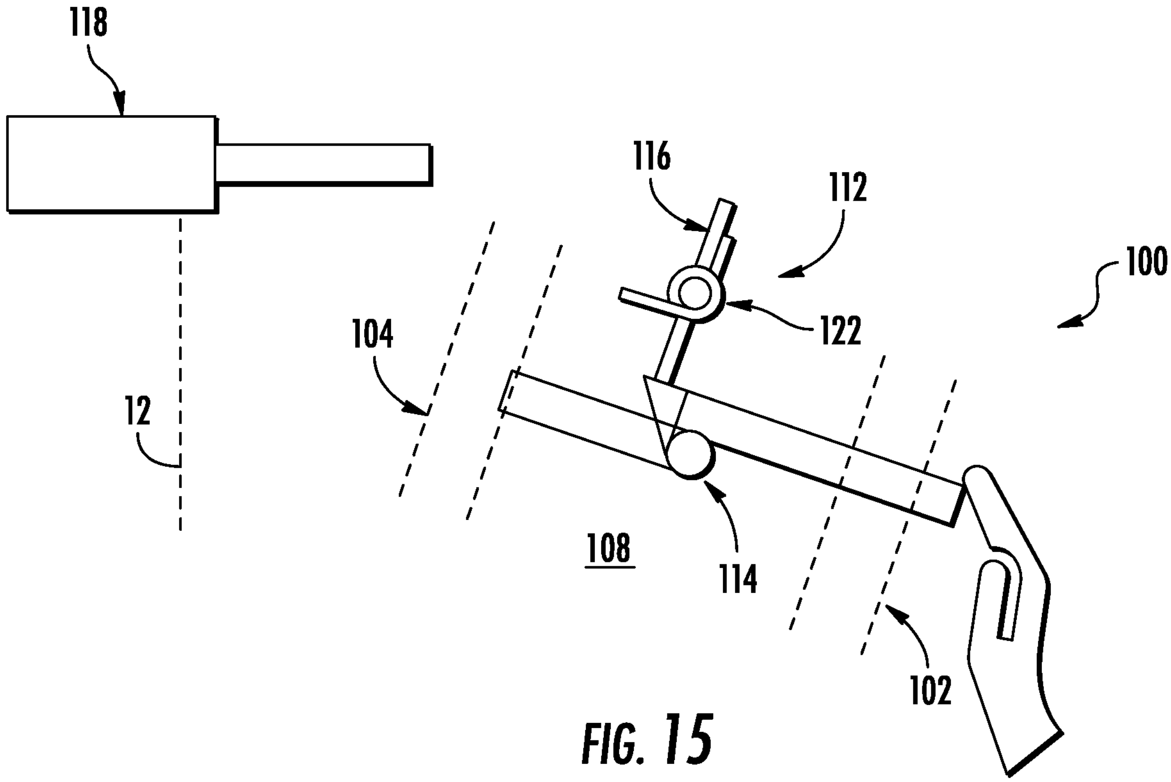
FIG. 15 provides a simplified, schematic diagram of operating a locking mechanism according to exemplary embodiments of the present disclosure, particularly illustrating the locking mechanism remaining locked in response to the door being opened.
Figure 16:
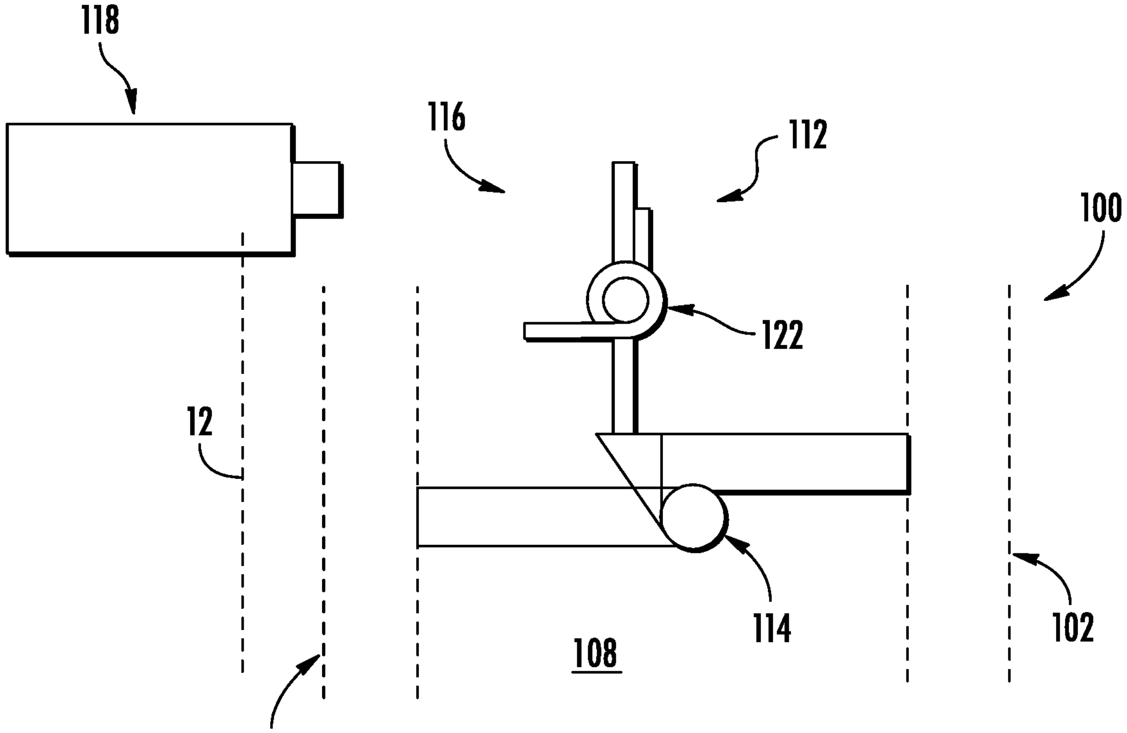
FIG. 16 provides a simplified, schematic diagram of operating a locking mechanism according to exemplary embodiments of the present disclosure, particularly illustrating the locking mechanism remaining locked in response to a power outage or loss.

In another embodiment, as shown in FIG. 15, even if the oven appliance 10 is cool, upon receipt by the controller 40 that the door 16 is open, the actuating device 118 cannot engage the locking member 116 (i.e., due to the open door as shown), which also prevents a user from separating the first door pane 102 from the second door pane 104. Moreover, as shown in FIG. 16, upon receipt by the controller 40 that the status of oven appliance 10 is unknown or a power loss has occurred, the controller 40 can send a signal to the actuating device 118 to refrain from engaging the locking member 116, which also prevents a user from separating the first door pane 102 from the second door pane 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A multi-pane door assembly for an oven appliance, the multi-pane door assembly comprising:

a door comprising a first door pane and a second door pane, the first door pane secured to the second door pane at a hinge point such that the first door pane is rotatable with respect to the second door pane between an open position and a closed position, wherein the first and second door panes define a space therebetween when the first door pane is in the closed position;

an engagement device for securing the first and second door panes together;

a locking mechanism for locking the engagement device so as to lock the first door pane with respect to the second door pane in the closed position, the locking mechanism comprising, at least, a locking member and an actuating device, wherein the locking member comprises a protrusion member recessed within the second door pane, wherein the protrusion member aligns with an opening in an exterior surface of the second door pane, and wherein the actuating device engages the locking member by extending through the opening in the exterior surface of the second door pane to engage the protrusion member; and a controller communicatively coupled to the actuating device to control movement of the actuating device, the controller comprising at least one processor, the processor configured to perform a plurality of operations, the plurality of operations comprising:

receiving one or more safety conditions relating to the oven appliance; and selecting whether to engage or disengage the actuating device based on whether the one or more safety conditions correspond to one or more predetermined safety conditions.

2. The multi-pane door assembly of claim 1, wherein selecting whether to engage or disengage the actuating device based on whether the one or more safety conditions correspond to the one or more predetermined safety conditions further comprises:

selecting to engage the actuating device only upon satisfaction of the one or more safety conditions corresponding to the one or more predetermined safety conditions, wherein engaging the actuating device moves the locking member so as to release the engagement device to allow opening of the first door pane with respect to the second door pane.

3. The multi-pane door assembly of claim 1, wherein selecting whether to engage or disengage the actuating device based on whether the one or more safety conditions correspond to the one or more predetermined safety conditions further comprises:

selecting to disengage the actuating device when the one or more safety conditions do not correspond to the one or more predetermined safety conditions, wherein disengaging the actuating device prevents movement of the locking member and prevents release of the engagement device, thereby preventing opening of the first door pane with respect to the second door pane.

4. The multi-pane door assembly of claim 1, wherein the one or more safety conditions comprise a temperature condition of the oven appliance and a position condition of the multi-pane door assembly, the position condition comprising one of an open position of the door or a closed position of the door.

5. The multi-pane door assembly of claim 4, wherein selecting whether to engage or disengage the actuating device based on whether the one or more safety conditions correspond to the one or more predetermined safety conditions further comprises:

determining whether the temperature condition and the position condition correspond to a temperature below a temperature threshold and the closed position of the door, respectively.

6. The multi-pane door assembly of claim 1, wherein the locking mechanism further comprises a base member, wherein the locking member is rotatably coupled to the base member and a spring member is arranged between the locking member and the base member, wherein the spring member biases the locking member in a closed position.

7. The multi-pane door assembly of claim 6, wherein, upon engagement of the locking member by the actuating device, biasing of the spring member is overcome by the actuating device.

8. The multi-pane door assembly of claim 6, wherein the locking member, the spring member, the base member, and the engagement device are arranged within the space between the first and second door panes and the actuating device is arranged within a cabinet of the oven appliance.

9. The multi-pane door assembly of claim 6, wherein the base member comprises a pivot arm and the locking member comprises a through hole that receives the pivot arm to allow for rotation of the locking member with respect to the base member.

10. The multi-pane door assembly of claim 6, wherein the base member further comprises a stop feature for limiting rotation of the locking member with respect to the base member.

11. The multi-pane door assembly of claim 1, wherein the engagement device comprises a latch or a catch.

12. A method of operating a multi-pane door assembly of an oven appliance, the multi-pane door assembly having a first door pane secured to a second door pane at a hinge point such that the first door pane is rotatable with respect to the second door pane between an open position and a closed position, the first and second door panes defining a space therebetween when the first door pane is in the closed position, the method comprising:

maintaining the first and second door panes together in the closed position via an engagement device;

locking the first door pane with respect to the second door pane in the closed position via a locking mechanism that engages the engagement device, the locking mechanism having, at least, a locking member and an actuating device, wherein the locking member has a protrusion member recessed within the second door pane;

aligning the protrusion member with an opening in an exterior surface of the second door pane;

receiving, via a controller, one or more safety conditions relating to the oven appliance; and engaging the protrusion member through the opening in the exterior surface of the second door pane via the actuating device only upon satisfaction of the one or more safety conditions corresponding to the one or more predetermined safety conditions.

13. The method of claim 12, wherein selecting whether to engage or disengage the actuating device of the locking mechanism based on whether the one or more safety conditions correspond to the one or more predetermined safety conditions further comprises:

selecting to engage the actuating device only upon satisfaction of the one or more safety conditions corresponding to the one or more predetermined safety conditions, wherein engaging the actuating device moves the locking member so as to release the engagement device to allow opening of the first door pane with respect to the second door pane.

14. The method of claim 12, wherein selecting whether to engage or disengage the actuating device of the locking mechanism based on whether the one or more safety conditions correspond to the one or more predetermined safety conditions further comprises:

selecting to disengage the actuating device when the one or more safety conditions do not correspond to the one or more predetermined safety conditions, wherein disengaging the actuating device prevents movement of the locking member and prevents release of the engagement device, thereby preventing opening of the first door pane with respect to the second door pane.

15. The method of claim 12, wherein the one or more safety conditions comprise a temperature condition of the oven appliance and a position condition of the multi-pane door assembly, the position condition comprising one of an open position of the multi-panel door assembly or a closed position of the multi-panel door assembly.

16. The method of claim 15, wherein selecting whether to engage or disengage the actuating device based on whether the one or more safety conditions correspond to the one or more predetermined safety conditions further comprises:

determining whether the temperature condition and the position condition correspond to a temperature below a temperature threshold and the closed position of the door, respectively.

17. The method of claim 13, wherein the locking mechanism further comprises a base member, wherein the locking member is rotatably coupled to the base member and a spring member is arranged between the locking member and the base member, the method further comprising biasing the locking member in a closed position via the spring member, wherein, upon engagement of the locking member by the actuating device, the biasing of the spring member is overcome by the actuating device.

18. The method of claim 17, further comprising positioning the locking member, the spring member, the base member, and the engagement device within the space between the first and second door panes and positioning the actuating device within a cabinet of the oven appliance.

* * * * *